Patented June 25, 1946

2,402,915

UNITED STATES PATENT OFFICE 2,402,915

METHOD OF RENDERING FLAVORS ACCESSIBLE IN NUT BUTTERS AND THE PRODUCT OBTAINED THEREBY

Joseph L. Rosefield, Laguna Beach, and Fitzhugh L. Avera, Oakland, Calif.

No Drawing. Application November 6, 1944, Serial No. 562,270

4 Claims. (Cl. 99—128)

The invention, in general, relates to the manufacture of nut butters and spreads. More particularly, the invention pertains to an improved method of production of such substances whereby full bodied flavors are attained and retained, and the products are stabilized to avoid gravital separation of oil constituents thereof.

The present application is a continuation-in-part of our co-pending application entitled "Process of rendering flavors accessible in nut butters, nut products, spreads and the like, and stabilization of the same, filed May 3, 1943, and bearing Serial No. 485,496.

It is perhaps well known to those skilled in the art of processing substances containing edible oils, fats or waxes, such as nut butters, nut products and the like, that the presence of certain free fatty acids such as oleic, palmitic or stearic acid act to shorten the induction period of rancidity. It also is well known in the art that the presence of these several free fatty acids assist in an early appearance of oxidative changes in such substances which results in highly undesirable flavors that are unnatural flavors and that render the substances unpalatable. In addition, and as pointed out in our above mentioned co-pending application, the comminution of the solid constituents of such substances as peanuts to render the same capable of assuming a desired consistency, causes a separation of the solid and remaining liquid phases in such a manner as to disperse the solid flavor carriers of the raw material to such an extent in the flavor insoluble liquid that the end product is appreciably deficient in flavor and, accordingly, is lacking in desired palatable characteristics.

We believe that we are the first in the art to overcome the loss of liquid flavor carriers during the manufacturing processes in the production of nut butters, nut products and the like without sacrificing the stability of the products, all as described in our above mentioned co-pending application. The present invention is directed, in general, toward this same end with the added concept of utilizing the free fatty acids present in the raw material in such a manner as to inhibit oxidative changes in the end product and obviate heretofore resultant undesirable flavors therein.

The general practice heretofore has been either to remove the free fatty acids entirely during the manufacture of the products or to introduce during the manufacture certain anti-oxidants to combat the oxidative activity of the free fatty acids. Those skilled in the art have experimented with the removal of various percentages of the free fatty acids, and the additions of varying amounts of anti-oxidants in an attempt to solve this problem of oxidative changes in the end product and the irritating undesirable flavors resulting from such oxidative changes. These experiments have, for the most part, been not entirely successful or practicable or other deleterious conditions have arisen.

It is a primary object of our invention to provide improved nut butters, nut products and the like of full bodied flavor and not subject to oxidative changes and the taking on of undesirable flavors.

Another object of our present invention is to provide food substances of the indicated nature which are additionally characterized by the presence therein of a component which has the dual function of enhancing the nutritious value of the substance and of inhibiting oxidative changes therein.

A still further object of the invention is to provide food substances of the aforementioned character in which the oil constituent is stabilized and gravital separation thereof will not result for appreciably longer periods of time.

Another object of our present invention is to provide an improved method of producing stabilized nut butters, nut products and the like of full bodied flavors which eliminates steps heretofore deemed necessary and desirable without sacrificing the stability, flavor or the nutritious value of the end products.

Other objects of the invention, together with some of the advantageous features thereof, will appear from the following description of our preferred products and preferred method of production. However, it is to be understood that we are not to be limited to the precise steps set forth nor to the precise order of the steps taken, as our invention, as defined in the appended claims, can be embodied in a plurality and variety of forms and can be practiced in a variety and plurality of ways.

We have applied our efforts and concepts as hereinafter described, largely to the manufacture of regular peanut butter, but the method set forth and our concepts equally are applicable to the production of any desired nut butters, nut products or spreads and other edible oil containing substances. For explanatory purposes solely, the present invention will be described in the peanut butter environment as typical of the improvements in the edible oil and butter art.

In its preferred mode, our improved method of rendering flavors accessible in nut butters, products and the like, as well as of stabilization thereof including the inhibition of the generation of undesirable flavors, preferably comprises, as exemplified in the manufacture of regular peanut butter, the steps of roasting and blanching of shelled peanuts, expelling therefrom a percentage of the edible oil present therein, introducing into the expelled oil a non-toxic alcohol radical capable of combining with the free fatty acids present in the oil and being active in the formation of a self-forming emulsion, then adding the resultant self-formed emulsion to the nut meal effluent from the oil expelling step, and then grinding the mass or mixture to the desired homogeneous consistency.

In accordance with our present invention, as exemplified in the manufacture of regular peanut butter, the customary initial steps of roasting, shelling and blanching the peanuts are carried out with any desired quantity of peanuts. Thereafter, the roasted and blanched peanuts are subjected to the action of an oil expeller to express therefrom a percentage of the oil naturally present therein and which contains free fatty acids. The expressed oil is then preferably filtered and we then add to the filtered oil an organic material of large resonant mass, an example of which is the non-toxic commercially available cholesteryl derivative known as cholesteryl-betaine-chloride, in an amount so that the oil volume is increased to an extent approximating 1.775% of its original weight. A quantity of 0.1N sodium hydroxide corresponding to approximately 8% by weight of the finished product is mixed with the oil in solution with the organic material, alcohol radical, above mentioned thus affording a self-formed contact emulsion in which the globules are in the nature of ½ micron in diameter.

It is to be appreciated that no mechanical or physical means are required to provide the emulsion beyond the components being mixed together to assure contact. In this contact emulsion, thus self-formed, the chemical valence activity of the free fatty acids is reduced through the participation of the free fatty acids in the formation of the contact emulsion. It is to be observed, that the free fatty acids have their most lipophilic portion in solution with the oil films and their saponified hydrophilic portions in solution with the water films. It may also be observed that the saponifiable portions of the free fatty acids do not necessarily have to be saponified but may be residing in co-ordinate bond with water-soluble metallic salts in solution with the water films. This co-ordinate bond or linkage can be stabilized with organic materials of sufficient resonant mass to tautomerically become ionized and reside with attached hydrocarbon chains in solution with the oil films while the polar end offers an ionic attraction to the water film. An example of such a material of large resonant mass is given above; namely, cholestryl-betaine-chloride.

After providing the contact or self-forming emulsion, as above specified, the emulsion is readmixed with the nut meal effluent from the oil expelling equipment and the mixture is subjected to grinding to an extent to effect an end product of desired consistency. The resultant product is substantially fibre free, resists oxidation and has no oil stratification upon standing for appreciably longer periods of time than other peanut butters. No appreciable oxidative changes occur in the product with resultant undesirable flavors.

As described in our above mentioned co-pending application, a flavor solvent of the character therein described is introduced into the mass of nut meal during the grinding step, such flavor solvent being introduced either alone or in the form of an emulsion. Or, if desired, the flavor solvent may be added as a flocculation agent whose polar nature alters the solid-liquid phases of the butter from a liquid dispersed in a solid or from a solid dispersed in a liquid to a stable plastic mass in that no gravital separation will occur or to a fluid having a low viscosity which resists gravital deposition of the solids or separation of the liquids. This flavor carrier can be, of course, identical with the flavor carrier driven off in the roasting step, or a flavor carrier of a different type, as desired. Suitable flavor carriers or solvents are water, or water combined with a negative catalyst, or an anti-oxidant, or a dineric interface modifier selected from a higher fatty acid group, such as a monoglyceride ester of a fatty acid.

The herein described method of manufacture produces a full, wholesome bodied flavor peanut butter that has an enhanced nutritional value because of the fact that none of the constituents of the raw material has been removed therefrom but, rather, has been retained in the food and their deleterious action neutralized or overcome. As a result of this improvement, the induction period of rancidity is increased and, moreover, the introduction of a non-toxic organic combining agent, capable of reducing the chemical valence of the free fatty acids by virtue of utilizing such acids as a component in the formation of a self-forming emulsion, into the nut oil, has afforded an end product which has a sharply reduced tendency to oxidation changes and, as a result, undesirable flavors in the end product do not arise. With the absence of undesirable flavors, and the retention of nutritious components of the raw material, as well as the return to the product of normally lost flavors or flavor carriers, we have provided a stable, full bodied flavor nut product substantially free of unwanted flavor developing properties.

We claim:

1. An improved nut butter comprising a homogeneous mass of comminuted nuts, and an emulsion containing cholesteryl-betaine-chloride.

2. An improved nut butter, as defined in claim 1, and including a flavor carrier in the emulsion.

3. In a method of producing nut butters, nut products, nut spreads and the like, the steps of expressing a percentage of the oil from a mass of nuts containing an edible oil in which free fatty acids are present, introducing cholesterol-betaine-chloride in the presence of sodium hydroxide into the expressed oil for contact with and acting as a component with the free fatty acids present in the oil in the formation of a self-forming emulsion, and then introducing the self-formed emulsion into the nut meal effluent from the oil expressing step.

4. A method of manufacturing nut butters comprising the steps of roasting, shelling and blanching a quantity of nuts, expressing a percentage of the oil from the roasted and blanched nuts, providing a self-forming emulsion by adding cholesterol-betaine-chloride to the expressed oil in the presence of sodium hydroxide for contact with the free fatty acids present in the oil, then introducing the self-formed emulsion into the nut meal effluent from the oil expressing step, and grinding the resultant mixture to a desired consistency while simultaneously introducing a flavor solvent into the mixture.

JOSEPH L. ROSEFIELD.
FITZHUGH L. AVERA.